(12) United States Patent
Hu et al.

(10) Patent No.: US 12,089,204 B2
(45) Date of Patent: Sep. 10, 2024

(54) RESOURCE SCHEDULING METHOD AND APPARATUS, AND COMPUTER-READABLE STORAGE MEDIUM

(71) Applicant: ZTE Corporation, Shenzhen (CN)

(72) Inventors: Youjun Hu, Guangdong (CN); Bo Dai, Guangdong (CN); Huiying Fang, Guangdong (CN); Weiwei Yang, Guangdong (CN); Kun Liu, Guangdong (CN); Luanjian Bian, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 326 days.

(21) Appl. No.: 17/487,960

(22) Filed: Sep. 28, 2021

(65) Prior Publication Data
US 2022/0086870 A1     Mar. 17, 2022

Related U.S. Application Data

(63) Continuation of application No. PCT/CN2020/076769, filed on Feb. 26, 2020.

(30) Foreign Application Priority Data

Mar. 29, 2019    (CN) .......................... 201910253422.2

(51) Int. Cl.
*H04W 72/1263*     (2023.01)
*H04L 1/00*     (2006.01)
(Continued)

(52) U.S. Cl.
CPC ....... *H04W 72/1263* (2013.01); *H04L 1/0071* (2013.01); *H04L 5/0012* (2013.01);
(Continued)

(58) Field of Classification Search
CPC ......... H04W 72/1263; H04W 72/0446; H04W 72/23; H04W 72/535; H04W 28/04;
(Continued)

(56) References Cited

U.S. PATENT DOCUMENTS

| | | | |
|---|---|---|---|
| 8,284,732 B2 | 10/2012 | Nimbalker et al. | |
| 2015/0092702 A1* | 4/2015 | Chen ..................... | H04L 5/0053 370/329 |

(Continued)

FOREIGN PATENT DOCUMENTS

| | | |
|---|---|---|
| CN | 105556888 A | 5/2016 |
| CN | 107241163 A | 10/2017 |

(Continued)

OTHER PUBLICATIONS

Xiaomi Communications, "Discussion on the Scheduling of Multiple DL/UL TBs", 3GPP TSG RAN WG1 Meeting #95 R1-1812900, Nov. 2, 2018, pp. 1-4.

(Continued)

*Primary Examiner* — Will W Lin
(74) *Attorney, Agent, or Firm* — Crowell & Moring LLP

(57) ABSTRACT

Disclosed are a resource scheduling method and apparatus, and a computer-readable storage medium. The method includes: an interleaving granularity of scheduled physical shared channels is determined according to a preset rule; and the scheduled physical shared channels are interleaved according to the interleaving granularity.

20 Claims, 4 Drawing Sheets

Determine an interleaving granularity of scheduled physical shared channels according to a preset rule — 110

Interleave the scheduled physical shared channels according to the interleaving granularity — 120

(51) Int. Cl.
  *H04L 5/00*     (2006.01)
  *H04W 72/0446*  (2023.01)
  *H04W 72/23*    (2023.01)
  *H04W 72/50*    (2023.01)

(52) U.S. Cl.
  CPC ....... *H04W 72/0446* (2013.01); *H04W 72/23* (2023.01); *H04W 72/535* (2023.01)

(58) Field of Classification Search
  CPC ... H04L 1/0071; H04L 5/0012; H04L 1/0041; H04L 1/08; H04L 5/0044
  See application file for complete search history.

(56) References Cited

U.S. PATENT DOCUMENTS

| | | | |
|---|---|---|---|
| 2020/0068540 A1* | 2/2020 | Wang | H04W 72/04 |
| 2022/0368489 A1* | 11/2022 | Grant | H04L 5/0053 |

FOREIGN PATENT DOCUMENTS

| | | |
|---|---|---|
| CN | 108632192 A | 10/2018 |
| CN | 110535556 A | 12/2019 |
| EP | 3 050 242 B1 | 4/2020 |
| WO | WO 2018/171474 A1 | 9/2018 |
| WO | WO 2021/031892 A1 | 2/2021 |
| WO | WO 2021/034700 A1 | 2/2021 |

OTHER PUBLICATIONS

ZTE "Consideration on Scheduling Enhancement for MTC" 3GPP TSG RAN WG1 Meeting #96bis R1-1904344, Mar. 30, 2019, pp. 1-8.
International Search Report and Written Opinion for international priority application No. PCT/CN2020/076769, dated May 19, 2020, 11 pages including English translation of International Search Report.
Extended European Search Report for Application No. 20783957.2 dated Nov. 18, 2022 (11 pages).
Indian Search Report for Application No. 202117049330 dated Sep. 23, 2022, including English translation (7 pages).
Xiaomi Communications, Discussion on the scheduling of multiple DL/UL TBs, 3GPP TSG RAN WG1 Meeting #94bis, R1-1810813, Sep. 28, 2018 (4 pages).
Sierra Wireless, "LTE-M Multiple Transport Block Grant Design Considerations", 3GPP TSG RAN WG1 Meeting #96, RI-1901630, Feb. 15, 2019 (13 pages).
Communication pursuant to Article 94(3) EPC for European Application No. 20783957.2 dated Feb. 7, 2024 (6 pages).

* cited by examiner

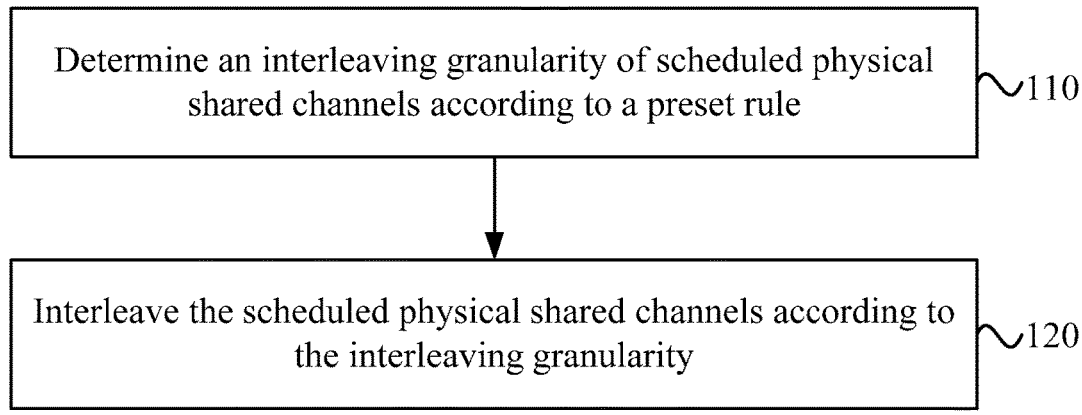
FIG. 1
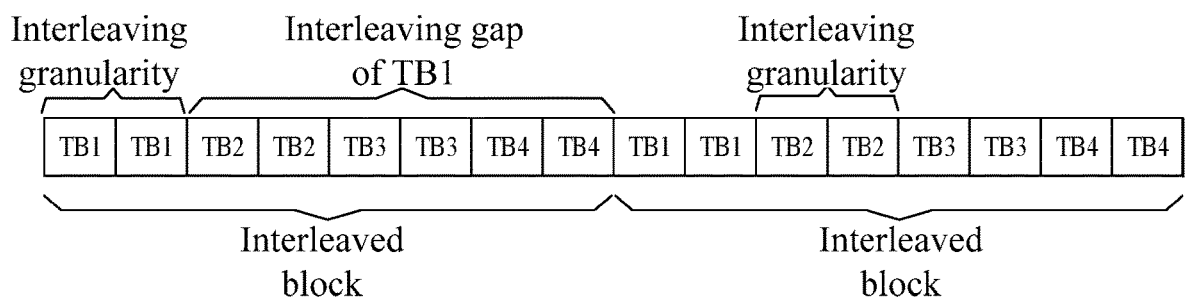
FIG. 2
FIG. 3

RESOURCE SCHEDULING METHOD AND APPARATUS, AND COMPUTER-READABLE STORAGE MEDIUM

The present application is a continuation of International Patent Application No. PCT/CN2020/076769, filed Feb. 26, 2020, which claims priority to Chinese Patent Application No. 201910253422.2, filed with the China National Intellectual Property Administration (CNIPA) on Mar. 29, 2019, disclosures of each of which are incorporated herein by reference in their entirety.

TECHNICAL FIELD

The present application relates to a wireless communication network, and for example, a resource scheduling method and apparatus, and a computer-readable storage medium.

BACKGROUND

In the process of technological evolution to Rel-16 version of the new radio (NR) standard of the fifth generation mobile networks (5G) of the third generation partnership project (3GPP), the interleaving of physical shared channel levels is expected, and the dispersion degree of interleaving between the physical shared channels directly affects the transmission performance. A mobile communication resource scheduling method in the related art adopts an interleaving technology that successive bits in one piece of information are sent in a non-successive manner, and the interleaving technology does not have the function of interleaving of the physical shared channels. Since different physical shared channels cannot be interleaved, the dispersion degree between physical shared channels is relatively low, which leads to a relatively low time-domain diversity gain in a resource scheduling process and the transmission reliability and effectiveness cannot be fully ensured.

SUMMARY

The present application provides a resource scheduling method and apparatus and a computer-readable storage medium.

An embodiment of the present application provides a resource scheduling method. The resource scheduling method includes steps described below. An interleaving granularity of scheduled physical shared channels is determined according to a preset rule, and the scheduled physical shared channels are interleaved according to the interleaving granularity.

An embodiment of the present application further provides a resource scheduling apparatus. The resource scheduling apparatus includes a granularity determination module and an interleaving module. The granularity determination module is configured to determine an interleaving granularity of scheduled shared channels according to a preset rule. The interleaving module is configured to interleave the scheduled physical shared channels according to the interleaving granularity.

An embodiment of the present application further provides a computer-readable storage medium, a computer program is stored on the computer-readable storage medium, and when the computer program is executed by a processor, implements the resource scheduling method described above.

BRIEF DESCRIPTION OF DRAWINGS

FIG. 1 is a flowchart of a resource scheduling method provided according to an embodiment;

FIG. 2 is a schematic diagram of physical shared channels before and after interleaving provided according to an embodiment;

FIG. 3 is a schematic diagram of physical shared channel interleaving provided according to an embodiment;

DETAILED DESCRIPTION

Figure 4:
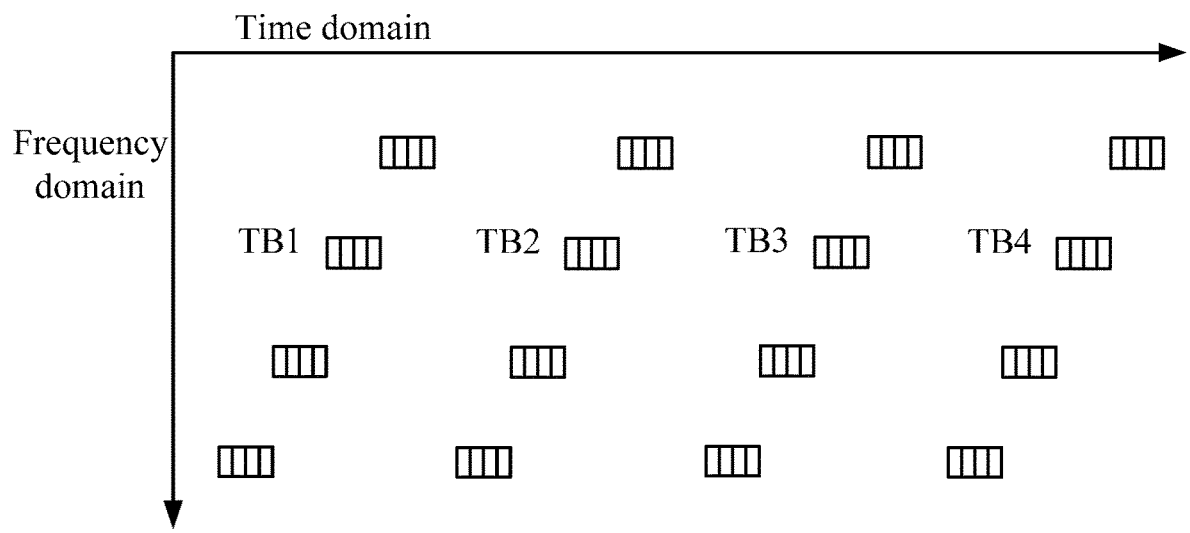
FIG. 4 is a schematic diagram showing simultaneous enabling of interleaving and frequency hopping provided according to an embodiment.

The present application will now be described with reference to the accompanying drawings and embodiments below.

For mobile communication channels, bit errors typically occur in strings. Aiming at the phenomenon, successive bits in one message are scattered and sent in a non-successive manner, namely the interleaving technology. Through the interleaving technology, even if string errors occur in a transmission process, since the errors are scattered bits, an error length is very short when successive bit strings are recovered at a receiving terminal, so that the transmission reliability is improved.

A mobile communication resource scheduling method in the related art adopts the interleaving technology that successive bits in one piece of information are sent in a non-successive manner, and the interleaving technology does not have the function of interleaving of physical shared channels. In the technological evolution process of Rel-16 version of the new radio (NR) standard of the 5G of the 3GPP, the interleaving of physical shared channel levels is expected. The physical downlink control channel (PDCCH) transmits control information related to a physical uplink shared channel (PUSCH) and a physical downlink shared channel (PDSCH), that is, downlink control information (DCI), and the DCI includes related contents such as resource allocation information and a modulation mode. After a user terminal decodes the DCI, PDSCH data or PUSCH data is further processed.

In this embodiment, for the case of configuring the interleaving function of physical shared channels, an interleaving granularity of scheduled physical shared channels is introduced, and the physical shared channels are arranged discretely according to a certain rule, so as to schedule at least one of PUSCHs or PDSCHs by one PDCCH, and the number of at least one of PUSCHs or PDSCHs is multiple. The interleaving granularity of physical shared channels directly affects the interleaving performance, and thus the transmission reliability is affected.

In the embodiments of the present application, a resource scheduling method is provided, so that the scheduled physical shared channels are interleaved according to an interleaving granularity determined according to a preset rule, and a relatively low diversity gain due to continuous arrangement of the physical shared channels is improved, thus the time-domain diversity gain in a scheduling process is improved, and the transmission reliability is ensured.

FIG. 1 is a flowchart of a resource scheduling method provided in an embodiment, and as shown in FIG. 1, the method provided in this embodiment includes step S110 and step S120.

In step S110, an interleaving granularity of scheduled physical shared channels is determined according to a preset rule.

The interleaving granularity refers to the number of sub-frames or time slots occupied by one physical shared channel in one interleaved block, and the interleaving granularity is a key parameter for interleaving multiple physical shared channels. One physical shared channel is divided into multiple data blocks, and data blocks of different physical shared channels are arranged discretely according to the interleaving granularity. After the interleaving function of physical shared channels is configured, the interleaving granularity of the scheduled physical shared channels is determined according to the preset rule, and the determined interleaving granularity provides the basis for the discrete arrangement of the physical shared channels. The preset rule includes various types of preset rules and is applicable to different scenarios to satisfy different actual requirements, for example, to improve the flexibility of interleaving granularity indication, reduce the interleaving complexity, or reduce the signaling overhead.

For example, in an embodiment, at least one value is selected from a preset granularity value set as the interleaving granularity.

In another embodiment, the interleaving granularity is a variable and is determined according to the number of the scheduled physical shared channels, the number of repetitions of a single scheduled physical shared channel, and the like. The greater the number of the scheduled physical shared channels, or the greater the number of repetitions of the single scheduled physical shared channel, the greater a value of a corresponding interleaving granularity is.

In step S120, the scheduled physical shared channels are interleaved according to the interleaving granularity.

At least two physical shared channels are arranged in an interleaved manner according to the interleaving granularity, so that data blocks of the same physical shared channel are discretely distributed in the time domain. In a resource scheduling process, the same physical shared channel is subjected to the dispersive transmission through mutually independent branches and then is merged by a receiving end. When different physical shared channels are subjected to independent transmission and fading, a probability that all data is deeply faded at the same time is very small, so that the receiving end extracts information from a receiving signal with relatively light fading, thus the error rate is reduced, and relatively good time-domain diversity gain is obtained.

FIG. 2 is a schematic diagram of physical shared channels before and after interleaving provided in an embodiment. It should be noted that in the resource scheduling process, data is sent from a media access control (MAC) layer to a physical layer in the form of a transport block (TB). In this embodiment, the scheduling of multiple PUSCHs and/or PDSCHs by one PDCCH is described as multi-TB scheduling. As shown in FIG. 2, data transmitted by physical shared channel 1 corresponds to TB1, data transmitted by physical shared channel 2 corresponds to TB2, and when TB1 and TB2 are not interleaved, data blocks of the same physical shared channel are adjacently arranged; after the TB1 and the TB2 are interleaved, data blocks of different physical shared channels are arranged in a crossed manner, so that data blocks of the same physical shared channel are distributed in a discrete manner, and thus a relatively good time-domain diversity gain is obtained.

According to this embodiment, the interleaving granularity is determined according to the preset rule, the scheduled physical shared channels are interleaved according to the interleaving granularity, and in a process that one PDCCH schedules multiple PUSCHs and/or PDSCHs, since data blocks of the same physical shared channel are arranged in a discrete manner, the case that the obtained diversity gain is relatively low due to the continuous arrangement is improved, and the interleaving of physical shared channel levels is achieved, thus improving the time-domain diversity gain in the scheduling process, and ensuring the transmission reliability.

The resource scheduling method provided by the embodiments of the present application is explained by using an example that physical shared channels are interleaved in the resource scheduling process.

In an embodiment, the step in which the interleaving granularity of the scheduled physical shared channels is determined according to the preset rule includes that the interleaving granularity is determined according to an interleaving granularity parameter, where the interleaving granularity parameter includes a frequency hopping granularity parameter or a first parameter configured by high-layer signaling. The first parameter or the frequency hopping granularity parameter is configured by the higher-layer signaling, and the first parameter may be configured to be consistent with a frequency hopping granularity or may be separately configured as a predefined value. The interleaving granularity is determined according to the first parameter or the frequency hopping granularity parameter. The interleaving granularity may be expressed in the form of $X*Ych1*L_{RU}*N_{RU}$, where Ych1 denotes the first parameter or the frequency hopping granularity parameter, the interleaving granularity is determined in combination with the first parameter or the interleaving granularity parameter. The interleaving granularity may be expressed as $N*Ych * L_{RU}*N_{RU}$, or max $\{N*Ych, N_{RU}*L_{RU}\}$, i.e., a larger value between $(N*Ych*L_{RU}*N_{RU})$ and max $\{N*Ych, N_{RU}*L_{RU}\}$, or $N_{RU}*L_{RU}$, or a common multiple of $(N*Ych)$ and $(N_{RU}*L_{RU})$.

It should be noted that the frequency hopping means that under the synchronous and simultaneous condition, a transmitting end and a receiving end transmit data through narrow-frequency carriers of a specific type, the carrier frequency is discretely changed according to the preset rule, and a gap of the frequency hopping is the frequency hopping granularity. The frequency hopping enablement is indicated by the DCI information. In some embodiments, the first parameter Ych1 may refer to the configuration of the frequency hopping granularity. The frequency hopping communication also has good anti-interference capability, even if part of frequency points are interfered with, the normal communication may still be carried out on other frequency points which are not interfered with, the frequency hopping transmission is adopted while the physical shared channels are interleaved, the diversity gain can be further improved.

According to the resource type (a first type and a second type) and whether a frequency hopping functionality is configured or not, there are four scenarios, which are respectively explained below.

In an embodiment, in the case where resources corresponding to the scheduled physical shared channels are first-type resources and radio resource control (RRC) signaling is not configured with the frequency hopping functionality, the interleaving granularity is determined according to the first parameter. When the resources corresponding to the scheduled physical shared channels are the first-type resources, $L_{RU}$ and $N_{RU}$ are both equal to 1, and the frequency hopping functionality is not configured, X is 1. In this scenario, X, $L_{RU}$ and $N_{RU}$ may be configured as 1 or not configured by default, and the interleaving granularity may be determined according to the first parameter Ych1. Correspondingly, the step in which the interleaving granularity is determined according to the first parameter includes that the interleaving granularity is determined as the first parameter.

In an embodiment, in the case where resources corresponding to the scheduled physical shared channels are first-type resources and RRC is configured with the frequency hopping functionality, the interleaving granularity is determined according to the frequency hopping granularity parameter and/or the number of frequency hopping narrow bands. When the resources corresponding to the scheduled physical shared channels are the first-type resources, corresponding $L_{RU}$ and $N_{RU}$ are both equal to 1, and when the frequency hopping is enabled, X is consistent with the number of frequency hopping narrow bands, or other values may be set according to the number of frequency hopping narrow bands to satisfy different actual requirements. At this time, $L_{RU}$ and $N_{RU}$ may be configured as 1 or may not be configured by default, and the interleaving granularity is determined according to the frequency hopping granularity parameter and/or the number of frequency hopping narrow bands. Correspondingly, the step in which the interleaving granularity is determined according to the frequency hopping granularity parameter and/or the number of frequency hopping narrow bands includes that a product of the frequency hopping granularity parameter and the number of frequency hopping narrow bands is used as the interleaving granularity; or the frequency hopping granularity parameter is directly used as the interleaving granularity, and the interleaving granularity is consistent with the frequency hopping granularity.

In an embodiment, in the case where resources corresponding to the scheduled physical shared channels are second-type resources and RRC is not configured with the frequency hopping functionality, the interleaving granularity is determined according to the first parameter, a time-domain length of a second-type unit resource and the number of the second-type resources; or the interleaving granularity is determined according to the first parameter and the number of the second-type resources. When the resources corresponding to the scheduled physical shared channels are the second-type resources, corresponding $L_{RU}$ is the time-domain length of the second-type unit resource, namely the time-domain length of resource units (RUs); $N_{RU}$ denotes the number of the second-type resources, namely the number of RUs, and the frequency hopping is not enabled, then X is 1. At this time, X may be configured as 1 or may not be configured by default. The interleaving granularity is determined according to the first parameter Ych1, the time-domain length $L_{RU}$ of the second-type unit resource and the number $N_{RU}$ of the second-type resources, the interleaving granularity is expressed as Ych1*$L_{RU}$*$N_{RU}$, or the interleaving granularity is expressed as Ych1*$N_{RU}$, in the case where the time-domain length $L_{RU}$ of the second-type unit resource is 1ms and X is 1.

Alternatively, the interleaving granularity is expressed as max {Ych1, $L_{RU}$*$N_{RU}$}, a larger value between Ych1 and $L_{RU}$*$N_{RU}$ is taken, or a common multiple of both Ych1 and $L_{RU}$*$N_{RU}$ is taken.

Correspondingly, a product of the first parameter, the time-domain length of the second-type unit resource and the number of the second-type resources is used as the interleaving granularity; or a product of the first parameter and the number of the second-type resources is used as the interleaving granularity.

In an embodiment, in the case where resources corresponding to the scheduled physical shared channels are second-type resources and RRC is configured with the frequency hopping functionality, the interleaving granularity is determined according to the frequency hopping granularity parameter, the time-domain length of the second-type unit resource, the number of the second-type resources and the number of frequency hopping narrow bands; or the interleaving granularity is determined according to the frequency hopping granularity parameter, the time-domain length of the second-type unit resource and the number of the second-type resources.

When the resources corresponding to the scheduled physical shared channels are the second-type resources, and corresponding LRu denotes the time-domain length of the second-type unit resource, NRu denotes the number of the second-type resources, and in the case where the frequency hopping is enabled, X is consistent with the number of the frequency hopping narrow bands, or other values may be set according to the number of the frequency hopping narrow bands quantity to satisfy different actual requirements. At this time, the interleaving granularity is determined according to the first parameter Ych1, the time-domain length LRu of the second-type unit resource, the number NRu of the second-type resources and the number of frequency hopping narrow bands.

Correspondingly, the interleaving granularity is determined according to one of the followings:

a product of the frequency hopping granularity parameter, the time-domain length of the second-type unit resource, the number of the second-type resources and the number of frequency hopping narrow bands is used as the interleaving granularity;

a larger value between a product of the frequency hopping granularity parameter and the number of frequency hopping narrow bands and a product of the time-domain length of the second-type unit resource and the number of the second-type resources is used as the interleaving granularity;

a product of the frequency hopping granularity parameter, the time-domain length of the second-type unit resource, and the number of the second-type resources is used as the interleaving granularity; or a larger value between the frequency hopping granularity parameter and a product of the time-domain length of the second-type unit resource and the number of the second-type resources is used as the interleaving granularity.

In an embodiment, Ych1 denotes the interleaving granularity parameter, when the granularity is X*Ych1*$L_{RU}$*$N_{RU}$ or max {X*Ych1, $L_{RU}$*$N_{RU}$}, and RU duration is 1 ms, the interleaving granularity is expressed as X*Ych1*NRu. X=1 indicates that the frequency hopping is not enabled at this time, and indicates the number of narrow bands when the frequency hopping is enabled. In order to satisfy the requirement of a larger granularity, X may also be taken to be a larger value such as 8, or 16. X is configured by the higher-layer signaling.

In an embodiment, a resource scheduling unit of the first-type resources is a physical resource block (PRB). A resource scheduling unit of the second-type resources includes a sub-physical resource block (Sub-PRB) or a resource unit.

In an embodiment, the step in which the interleaving granularity of the scheduled physical shared channels is determined according to the preset rule includes that the interleaving granularity is determined according to the time-domain length of the second-type unit resource and the number of the second-type resources.

The step in which the interleaving granularity is determined according to the time-domain length of the second-type unit resource and the number of the second-type resources includes that a product of the time-domain length of the second-type unit resource and the number of the second-type resources is used as the interleaving granularity, i.e., the granularity is $L_{RU}*NRu$.

In an embodiment, the step in which the interleaving granularity of the scheduled physical shared channels is determined according to the preset rule includes steps described below:

the interleaving granularity is determined according to a coefficient and time-domain resources occupied by the scheduled physical shared channels; or the interleaving granularity is determined according to the time-domain resources occupied by the scheduled physical shared channels; where the time-domain resources occupied by the scheduled physical shared channels are: the time-domain length of a resource occupied by a single scheduled physical shared channel, the maximum time-domain length of a single scheduled physical shared channel, the time-domain length of all interleaved physical shared channels, or the number of repetitions of the scheduled physical shared channels.

In an embodiment, the time-domain resources occupied by the scheduled physical shared channels are represented as R, the coefficient is represented as X', and the interleaving granularity is determined according to R' and X'. The time-domain resources R' occupied by the scheduled physical shared channels are represented as one of that: R'=R*Z*X1*T, which represents the maximum time-domain length (gap) of the single scheduled physical shared channel; or R'=R*Z*(X1+1)*T, which represents the time-domain length of all interleaved physical shared channels, R'=R*Z*T, which represents the time-domain length of the resource occupied by the single scheduled physical shared channel, R'=R, which represents the number of repetitions of the scheduled physical shared channels, or R'=R*(X1+1), which represents a product of the number of repetitions and the number of the physical shared channels.

R is the number of repetitions of the scheduled physical shared channels, Z is the number of RUs, (X1+1) is the number of the scheduled physical shared channels, and T is the time-domain length of RUs.

In an embodiment, the coefficient is determined according to the time-domain resources R' occupied by the scheduled physical shared channels and a fourth threshold, the coefficient is at least one of ½, ¼, ⅛ or 1/16, and the fourth threshold includes at least one threshold. That is, the coefficient is determined by comparing the occupied time-domain resources with the fourth threshold.

In an embodiment, the step in which the coefficient is determined according to the time-domain resources R' occupied by the scheduled physical shared channels and the fourth threshold is as follows:

in the case where A'<R'<=B', the coefficient is determined to be ½, and correspondingly, the corresponding interleaving granularity is a product of R' and the determined coefficient, i.e., R'/2;

in the case where B'<R'<=C', the coefficient is determined to be ¼, and correspondingly, the corresponding interleaving granularity is R'/4;

in the case where D'<R'<=E', the coefficient is determined to be ⅛, and correspondingly, the corresponding interleaving granularity is R'/8; and in the case where E'<R'<=F', the coefficient is determined to be 1/16, and correspondingly, the corresponding interleaving granularity is R'/16;

A', B', C', D', E', F' and the like are the fourth threshold, and multiple fourth thresholds are provided.

In an embodiment, the interleaving granularity is determined according to the time-domain resources occupied by the scheduled physical shared channels and a fifth threshold, where the coefficient is at least one of 4, 8, 16 or 32, and the fifth threshold includes at least one threshold. The interleaving granularity may be determined directly according to R' and the fifth threshold, without determining the coefficient. The specific details are as follows:

in the case where A"<R'<=B", the coefficient is determined to be ½, and correspondingly, the corresponding interleaving granularity is a product of R' and the determined coefficient, i.e., R'/2;

in the case where B"<R'<=C", the interleaving granularity is R'/4;

in the case where D"<R'<=E", the interleaving granularity is R'/8; and in the case where E"<R'<=F", the interleaving granularity is R'/16;

A", B", C", D", E", F" and the like are the fifth thresholds, and multiple fifth thresholds are provided.

In an embodiment, the interleaving granularity is determined according to the number of repetitions of the scheduled physical shared channels and the predefined threshold, the predefined threshold includes at least one predefined threshold, and specific details are as follows.

Table 1 is a mapping relation table of the number of repetitions of the scheduled physical shared channels and the interleaving granularity provided according to an embodiment. As shown in Table 1, the number R of repetitions of the scheduled physical shared channels is compared to predefined thresholds A, B, and C to determine the corresponding interleaving granularity and whether to interleave.

TABLE 1

Mapping relation table of the number of repetitions of the scheduled physical shared channels and the interleaving granularity

| R | Interleaving granularity manner one | Interleaving granularity manner two | Interleaving granularity manner three |
|---|---|---|---|
| 1 < R <= A | non-interleaving | non-interleaving | non-interleaving |
| A < R <= B | R/2 | 4 | min{R/2, 4} |
| B < R <= C | R/4 | 8 | min{R/4, 8} |
| C < R | R/8 | 16 | min{R/8, 16} |

As shown in Table 1, in the case where 1<R<=A, and the number of repetitions of the scheduled physical shared channels is relatively small, and an interleaving enabling condition is not satisfied. A<R<=B is used as an example, the interleaving granularity may be determined to be R/2 according to manner one; the interleaving granularity may be determined to be 4 according to manner two; and the interleaving granularity may be determined to be a smaller value of the interleaving granularity in manner one and manner two according to manner three. In some embodiments, the interleaving granularity determined in manner three may also be configured to be a larger value of the interleaving granularity in manner one and manner two, and whether to select the smaller value or the larger value is configured by the higher-layer signaling. It should be noted that the more the number of repetitions of the scheduled physical shared channels, the larger the corresponding interleaving granularity may be, or the corresponding interleaving granularity may be unchanged.

In an embodiment, the interleaving granularity is determined according to the number of repetitions of the scheduled physical shared channels and the predefined threshold, one predefined threshold is provided, and details are as follows.

Table 2 is another mapping relation table of the number of repetitions of scheduled physical shared channels and the interleaving granularity provided according to an embodiment.

TABLE 2

Another mapping relation table of the number of repetitions of scheduled physical shared channels and the interleaving granularity

| Number of repetitions | Interleaving granularity |
|---|---|
| $1 < R <= A1$ | non-interleaving |
| $A1 < R$ | at least one of $\{4, 8, 16, 32\}$, or at least one of $\{R/2, R/8, R/16, R/32\}$ |

As shown in Table 2, the number R of repetitions of the scheduled physical shared channels is compared to a predefined threshold A1 to determine a corresponding interleaving granularity and whether to interleave. $1<R<=A1$ corresponds to the case of non-interleaving; in the case where $A1<R$, at least one value is selected from a preset granularity value set as the interleaving granularity.

In an embodiment, the interleaving granularity is determined according to the predefined threshold and the number of repetitions of the scheduled physical shared channels, and two predefined thresholds are provided, and details are as follows.

Table 3 is another mapping relation table of the number of repetitions of scheduled physical shared channels and the interleaving granularity provided according to an embodiment. As shown in Table 3, the number R of repetitions of the scheduled physical shared channels is compared to predefined thresholds A2 and B2 to determine a corresponding interleaving granularity and whether to interleave.

TABLE 3

Another mapping relation table of the number of repetitions of scheduled physical shared channels and the interleaving granularity

| Number of repetitions R | Interleaving granularity manner one | Interleaving granularity manner two | Interleaving granularity manner three |
|---|---|---|---|
| $1 < R <= A2$ | non-interleaving | non-interleaving | non-interleaving |
| $A2 < R <= B2$ | R/4 | 4 | min$\{R/2, 4\}$ |
| $B2 < R$ | R/16 | 16 | max$\{R/16, 16\}$ |

As shown in Table 3, $1<R<=A2$ corresponds to the case of non-interleaving; $A2<R<=B2$ is used as an example, the interleaving granularity may be determined to be R/4 in manner one; the interleaving granularity may be determined to be 4 in manner two, the interleaving granularity may be determined to be a smaller value of the interleaving granularity in manner one and manner two according to manner three, and when $B2<R$, the interleaving granularity is determined to be a larger value of the interleaving granularity in manner one and manner two. Whether to select the smaller value or the larger value is configured by the high-level signaling. It should be noted that the more the number of repetitions of the scheduled physical shared channels, the larger the corresponding interleaving granularity may be, or the corresponding interleaving granularity may be unchanged.

It should be noted that the predefined thresholds A, B, C, A1, A2, and B2 may be configured by a base station, or may be predefined. When the number of repetitions of the scheduled physical shared channels is relatively small, the corresponding interleaving granularity is also relatively small, so that more channel characteristics are easy to be obtained during transmission, thus further improving the diversity gain; and when the number of repetitions is more, a too-small interleaving granularity will lead to a high interleaving complexity. In this case, the interleaving granularity needs to be relatively large to reduce the complexity, and a relatively larger time-domain diversity gain may be obtained.

In an embodiment, the interleaving granularity is determined according to the number of repetitions of the scheduled physical shared channels, the number of the scheduled physical shared channels, and the predefined threshold, multiple predefined thresholds are provided, and details are as follows.

Table 4 is another mapping relation table of the number of repetitions of the scheduled physical shared channels and the interleaving granularity provided according to an embodiment. As shown in Table 4, a corresponding interleaving granularity and whether to interleave or not are determined according to the number R of repetitions of the scheduled physical shared channels, the number of the scheduled physical shared channels (the number of TBs), and the predefined thresholds A3, B3, and C3.

TABLE 4

Another mapping relation table of the number of repetitions of the scheduled physical shared channels and the interleaving granularity

| Number of repetitions | Number of TBs | | |
|---|---|---|---|
| | 1 | 2, 3, 4 | 5, 6, 7, 8 |
| $1 < R <= A3$ | non-interleaving | non-interleaving | non-interleaving |
| $A3 < R <= B3$ | | G1 | G2 |
| $B3 < R <= C3$ | | G2 | G3 |
| $C3 < R$ | | G3 | G4 |

$1<R<=A1$ corresponds to the case of non-interleaving, the number of TBs being 1 corresponds to the case of non-interleaving; $A3<R<=B3$ and the number of TBs being 2 are used as an example, which corresponds to the interleaving granularity G1. G1-G4 are selected from a preset granularity value set, and the preset granularity value set includes $\{4, 8, 16, 32\}$ and $\{R/2, R/8, R/16, R/32\}$. It should be noted that the more the number of TBs or the number of repetitions of the scheduled physical shared channels, the larger the interleaving granularity may be, or the interleaving granularity may be unchanged. It should be noted that the predefined thresholds A3, B3, and C3 may be configured by the base station, or may be predefined.

In an embodiment, the interleaving granularity is determined according to the number of repetitions of the scheduled physical shared channels and the predefined threshold, two predefined thresholds are provided, and details are as follows:

Table 5 is another mapping relation table of the number of repetitions of the scheduled physical shared channels and the interleaving granularity provided according to an embodiment. As shown in Table 5, the corresponding interleaving granularity and whether to interleave or not are determined according to the number R of repetitions of the scheduled physical shared channels and the number of the scheduled physical shared channels (the number of TBs). The value of Mn increases as n increases. The value of Mn contains at least one of {1, 2, 4, 8, 16, 32} or {R/2, R/8, R/16, R/32}.

TABLE 5

Another mapping relation table of the number of repetitions of the scheduled physical shared channels and the interleaving granularity

| Number of TBs | 0 | 1 (R/2) | 2(R/4) | ... | m (R/H) |
|---|---|---|---|---|---|
| 1, 2 | non-interleaving | non-interleaving | non-interleaving | ... | non-interleaving |
| 3, 4 | non-interleaving | $M_1$ | $M_1$ | ... | $M_{n-2}$ |
| 5, 6 | non-interleaving | $M_1$ | $M_2$ | ... | $M_{n-1}$ |
| 7, 8 | non-interleaving | $M_2$ | $M_3$ | ... | $M_n$ |

In an embodiment, the step in which the interleaving granularity of the scheduled shared channels is determined according to the preset rule includes:

the interleaving granularity is indicated according to downlink control information (DCI); or the interleaving granularity is configured according to wireless resource control signaling; the interleaving granularity is at least one of: 1, 2, 4, 8, 16, 32, 64, R/2, R/8, R/16 or R/32, and R is the number of repetitions of the scheduled physical shared channels.

The above methods directly indicate the interleaving granularity and include that the preset or default fixed granularity value is adopted uniformly according to the DCI indication, the base station configuration, or after satisfying the interleaving enabling condition. The method for directly indicating the interleaving granularity is simple and clear, but implies inflexibility at the same time, which may lead to no maximum performance gain and poor applicability to all application scenarios.

FIG. 3 is a schematic diagram of interleaving physical shared channels provided according to an embodiment. As shown in FIG. 3, the number of the scheduled physical shared channels is 4 (TB1, TB2, TB3, and TB4); a single scheduled physical shared channel occurs four times in total, and R=4. A group of TB1 to TB4 is an interleaved block, and a gap between two interleaved blocks of the same scheduled physical shared channel is an interleaving gap. The number of repetitions of the scheduled physical shared channels in one interleaved block is the interleaving granularity, i.e., the interleaving granularity as shown in FIG. 3 is 2.

In an embodiment, before the scheduled physical shared channels are interleaved according to the interleaving granularity, the method further includes steps described below, an interleaving function is configured by a radio resource control layer; and an interleaving enabling condition is determined to be satisfied according to downlink control information or radio resource control signaling.

In an embodiment, after the interleaving function of the scheduled physical shared channels is configured by the radio resource control layer, the interleaving enabling condition is determined to be satisfied according to the indication of DCI information or according to RRC signaling. The DCI information includes resource allocation information, a modulation manner and other related contents, and in the case where the DCI information indicates that the interleaving of the physical shared channels is supported, the interleaving enabling condition is determined to be satisfied. The RRC allocates radio resources and sends related signaling when the RRC connection radio resource is allocated, reconfigured or released. For an established RRC connection, the RRC may reconfigure the radio resource and coordinate different radio resource bearers related to the RRC connection. In the case where the interleaving function is configured in the RRC signaling, it is determined that the scheduled shared channels satisfy the interleaving enabling condition, and the interleaving granularity is determined according to the preset rule.

It should be noted that the method of DCI indication is adopted, the indication of the interleaving granularity is relatively flexible, but one bit is required to indicate the signaling overhead of the DCI. After the interleaving function is configured by the RRC, all TBs are interleaved, so that the interleaving in some scenarios has no gain, but the complexity is increased.

In an embodiment, before the scheduled physical shared channels are interleaved according to the interleaving granularity, the method further includes a step described below, after the interleaving function is configured by a radio resource control layer, an interleaving enabling condition is determined to be satisfied according to a predefined threshold, where the predefined threshold is determined according to radio resource control signaling.

In an embodiment, after the interleaving function of the scheduled physical shared channels is configured by the radio resource control layer, the predefined threshold is determined according to the RRC signaling, and the predefined threshold is used for determining whether the scheduled physical shared channels satisfy the interleaving enabling condition or not. The predefined threshold may be used for determining whether the number of repetitions, the time-domain length and the like of TBs support the implementation of interleaving. For example, the interleaving cannot be enabled when the number of TBs is only 1, there are at least two TBs (at least TB1 and TB2), the number of repetitions of each TB must be greater than or equal to 2, etc.

In an embodiment, the step in which the interleaving enabling condition is determined to be satisfied according to the predefined threshold includes that: in the case where a product of R*Z*T*M as time-domain resources occupied by the scheduled physical shared channels is greater than or equal to the predefined threshold, the interleaving enabling condition is determined to be satisfied; where M is 1 or the number of the scheduled physical shared channels, Z is 1 or the number of resources corresponding to the scheduled physical shared channels, T is 1 or the time-domain length of the resource units corresponding to the scheduled physical shared channels, and R is the number of repetitions of the scheduled physical shared channels.

It should be noted that the method that the interleaving enabling condition is determined to be satisfied according to the time-domain resources occupied by the scheduled physical shared channels and the predefined threshold is a method for dynamically indicating that the interleaving enabling condition is satisfied, TB interleaving is triggered only when the hierarchical gain exists, the DCI overhead is not required, the flexibility of indicating the interleaving is ensured, and certain complexity may be reduced at the same time.

In an embodiment, in the case where Z is 1, T is 1 and M is 1, the time-domain resources occupied by the scheduled physical shared channels are R, that is, the number of repetitions of the scheduled physical shared channels is R. Correspondingly, in the case where the number of repetitions of the scheduled physical shared channels is greater than or equal to the predefined threshold, the interleaving enabling condition is determined to be satisfied.

The predefined threshold includes a first threshold, a second threshold and/or a third threshold, the first threshold is the interleaving granularity, the second threshold is determined according to the interleaving granularity and a preset coefficient, the third threshold is determined according to the interleaving granularity parameter and the preset coefficient; and the preset coefficient includes at least one of 1, 2, 4 or 8. The interleaving granularity is determined according to radio resource control signaling, and the preset coefficient is a fixed value or is configured by the radio resource control signaling.

In an embodiment, the predefined threshold is the first threshold, and the first threshold is the interleaving granularity. Correspondingly, in the case where the number of repetitions of the scheduled physical shared channels is greater than or equal to the interleaving granularity, the interleaving enabling condition is determined to be satisfied; and in the case where the interleaving enabling condition is determined to be less than the interleaving granularity, the interleaving enabling condition is not satisfied. The interleaving granularity is determined according to the preset rule, may be a preset granularity value, or may be indicated by DCI or configured by a base station, and the like. When the number of repetitions of the TB is greater than or equal to the interleaving granularity, one TB is sufficiently dispersed in multiple interleaved blocks. For example, when the interleaving granularity is 4 and the number of repetitions of TB1 is 4, four times of TB1 may only appear in the same interleaved block, there is no next interleaved block, and therefore the interleaving cannot be enabled.

In an embodiment, the predefined threshold is the second threshold, and the second threshold is determined according to the interleaving granularity and the preset coefficient. The second threshold is represented as the interleaving granularity*X2, and accordingly, in the case where the number of repetitions of the scheduled physical shared channels is greater than or equal to the interleaving granularity*X2, the interleaving enabling condition is determined to be satisfied. X2 is the preset coefficient and is at least one of 1, 2, 4 or 8.

In an embodiment, the predefined threshold is the third threshold, and the third threshold is determined according to the interleaving granularity parameter and the preset coefficient. The interleaving granularity parameter includes a first parameter Ych1 configured by high-layer signaling. Correspondingly, in the case where the number of repetitions of the scheduled physical shared channels is greater than or equal to X3*Ych1 or the number of repetitions of the scheduled physical shared channels is greater than or equal to Ych1, the interleaving enabling condition is determined to be satisfied. Ych1 is the interleaving granularity parameter, and X3 is the preset coefficient and is at least one of 1, 2, 4 or 8. The third threshold is X*Ych1, which is at least one of Ych1, 2*Ych1, 4*Ych1, or 8*Ych1. Ych1 may refer to a configuration of the frequency hopping granularity or may be other predefined values independently configured by the high-layer signaling. The number of repetitions of the physical shared channel is greater than or equal to the predefined threshold, so that one physical shared channel is sufficiently dispersed in multiple interleaved blocks, thus achieving the interleaving of the physical shared channels.

In an embodiment, in the case where Z=1, T=1 and M is the number of the scheduled physical shared channels, the interleaving enabling condition is determined to be satisfied according to the number of the scheduled physical shared channels, the number of repetitions of the scheduled physical shared channels and the predefined threshold; where the predefined threshold includes a fifth threshold, a sixth threshold, and a seventh threshold. In the case where the number of the scheduled physical shared channels is greater than or equal to the fifth threshold and the number of repetitions of the scheduled physical shared channels is greater than or equal to the sixth threshold, the interleaving enabling condition is determined to be satisfied; or in the case where a product of the number of scheduled physical shared channels and the number of repetitions of the scheduled physical shared channels is larger than the seventh threshold, the interleaving enabling condition is determined to be satisfied.

In the case where Z=1, T=1 and M is the number of the scheduled physical shared channels, the time-domain resources occupied by the scheduled physical shared channels are represented as R*M, where (R*M) is (the number of repetitions of TBs*the number of TBs), and when a resource unit is not the RU, a total time-domain length is used for determination. Correspondingly, in the case where the number of the scheduled physical shared channels is greater than or equal to the fifth threshold and the number of repetitions of the scheduled physical shared channels is greater than or equal to the sixth threshold, the interleaving enabling condition is determined to be satisfied. For example, in the case where the fifth threshold is X5 and the sixth threshold is X6, when the number of the scheduled physical shared channels is greater than or equal to X5, and the number of repetitions of the scheduled physical shared channels is greater than or equal to X6, the interleaving is enabled. For example, if X5=3 and X6=4, and in the case where the number of TBs is greater than or equal to 3 and the number of repetitions of TBs is greater than or equal to 4, the interleaving is enabled. As another example, when the seventh threshold is 12, in the case where the product of the number of TBs and the number of repetitions of TBs is greater than or equal to 12, the interleaving enabling condition is determined to be satisfied.

In an embodiment, M is the number of the scheduled physical shared channels, T is the time-domain length of the resource units corresponding to the scheduled physical shared channels, and Z is the number of the resources corresponding to the scheduled physical shared channels, then the enabling is determined according to the time-domain resources occupied by the scheduled physical shared channels and the predefined threshold. The predefined threshold includes an eighth threshold and a ninth threshold, the eighth threshold is determined according to the interleaving granularity or the interleaving granularity parameter, and the eighth threshold is determined according to the interleaving granularity parameter, and the interleaving granularity parameter includes the first parameter or the frequency hopping granularity parameter configured by the high-layer signaling. The ninth threshold is determined according to the interleaving granularity and a preset coefficient, the ninth threshold is determined according to the interleaving granularity parameter and the preset coefficient, the preset coefficient includes at least one of 1, 2, 4 or 8, the interleaving granularity parameter is determined according to the radio resource control signaling, and the preset coefficient is a fixed value or is configured by the radio resource control signaling.

In an embodiment, the time-domain resources occupied by the scheduled physical shared channels are represented as R', R'=R*Z*X1*T, which represents one of: the maximum time-domain length (gap) of a single scheduled physical shared channel;

R'=R*Z*(X1+1)*T the time-domain length of all interleaved physical shared channels;

R'=R*Z*T; R=R*Z*T, the time-domain length of the resource occupied by a single scheduled physical shared channel; or R'=R the number of repetitions of the scheduled physical shared channels.

R is the number of repetitions of the scheduled physical shared channels, Z is the number of RUs, (X1+1) is the number of the scheduled physical shared channels, and T is the time-domain length of RUs.

The preset coefficient is represented as X7, and in the case where the interleaving granularity may be determined according to the time-domain resource R' occupied by the scheduled physical shared channels and the preset coefficient X7, the interleaving enabling condition is determined to be satisfied.

In one exemplary embodiment, the step in which the interleaving enabling condition is determined to be satisfied according to the predefined threshold includes that: in the case where the time-domain length occupied by the scheduled physical shared channels is greater than or equal to the predefined threshold, the interleaving enabling condition is determined to be satisfied.

In an embodiment, in the case where Z*R*X*T>MinGap or Z*R*(X1+1)*T MinGap, the interleaving enabling condition is determined to be satisfied. The number of TBs is (X1+1), the number of RUs is Z, the time-domain length of RUs is T ms, and R is the number of repetitions of one TB. MinGap is the minimum time-domain length of one TB between adjacent interleaved blocks. Correspondingly, in the case where Z*R*X*T as the time-domain resources occupied by the scheduled physical shared channels is greater than or equal to MinGap, or Z*R*(X1+1)*T is greater than or equal to MinGap, the interleaving condition is satisfied. It should be noted that MinGap is configured by the base station or is a predefined numerical value. MinGap may be configured or predefined as different numerical values in different application scenarios. MinGap is the minimum time-domain length of one TB between adjacent interleaved blocks, and it is considered that when the gap reaches MinGap, the interleaving of TBs may be adopted, and in the case where the interleaving enabling condition is not satisfied, the interleaving is not performed. MinGap varies in different scenarios. The time-domain length occupied by the scheduled physical shared channels is long enough, so that one physical shared channel is enough to be dispersed in multiple interleaved blocks. Alternatively, MinGap is defined by a high layer, which is written as MinGap=Ych1*N. Ych1 is the interleaving granularity parameter, and (Ych*N) is the interleaving granularity. When no frequency hopping is configured, the value of N is equivalent to none. When the frequency hopping functionality is configured, N is at least one of {1, 2, 4, 8}.

In an embodiment, the interleaving enabling condition is determined to be satisfied according to different coverage levels. The 3GPP protocol introduces the coverage enhancement (CE) level. For a connection state, two coverage modes of CE mode A and CE mode B are divided, a corresponding mapping relation exists between the coverage level of an idle state and the coverage mode of the connection state, and the overhead may be greatly saved through differential management of different coverage levels. For machine type communication (MTC) CE mode A, the interleaving enabling condition is determined to be satisfied through any one of a DCI indication, an RRC configuration of the interleaving function, or the comparison between the time-domain resources occupied by the scheduled physical shared channels and the predefined threshold, while for CE mode B, the TB interleaving is adopted during multi-TB scheduling.

FIG. 4 is a schematic diagram showing the simultaneous enabling of interleaving and frequency hopping provided in an embodiment. As shown in FIG. 4, different TBs are not only interleaved according to the interleaving granularity, discretely distributed in the time domain, but also distributed on narrowband carriers of different frequencies, discretely distributed in the frequency domain. The diversity gain is further improved by enabling one TB to traverse all narrow bands in one interleaved block at least once.

It should be noted that two most critical parameters for the frequency hopping are the number N of frequency hopping narrow bands and the frequency hopping granularity Ych. In order to ensure that one TB traverses all narrow bands in one interleaved block at least once, when the number of TBs is an even number, TBs need to be shifted.

In an embodiment, after the frequency hopping is enabled, when the number of TBs is an even number, the position of one TB in the current interleaved block is shifted with reference to the position of the one TB in the previous interleaved block, and the shift is performed in the following manner:

There are (R/Ych) interleaved blocks in total for one transmission. When an $i^{th}$ interleaved block is in frequency hopping transmission, a position of a $j^{th}$ TB in the $i^{th}$ interleaved block is set to be $X_{i,j}$, the number of TBs is set to be M, and the position $X_{i,j}$ has a value range of [1, M]. The position of the $j^{th}$ TB in the $i^{th}$ interleaved block satisfies the following formula: $X_{i,j}=(X_{i-1,j-1})$ mod M, where mod M is a remainder operation on M. If the number of the narrow bands is N, a narrow band position where the $j^{th}$ TB is located is P, and P=((i−1)*M+Xi, j) mod N is satisfied. In the case where the number of TBs is an odd number, the self-shifting is not needed, and the frequency hopping transmission is performed in sequence according to the frequency hopping granularity. Through the shift operation described above, the case that one TB periodically appears on the same narrow band to cause incapability of traversing the narrow bands is avoided.

Figure 5:
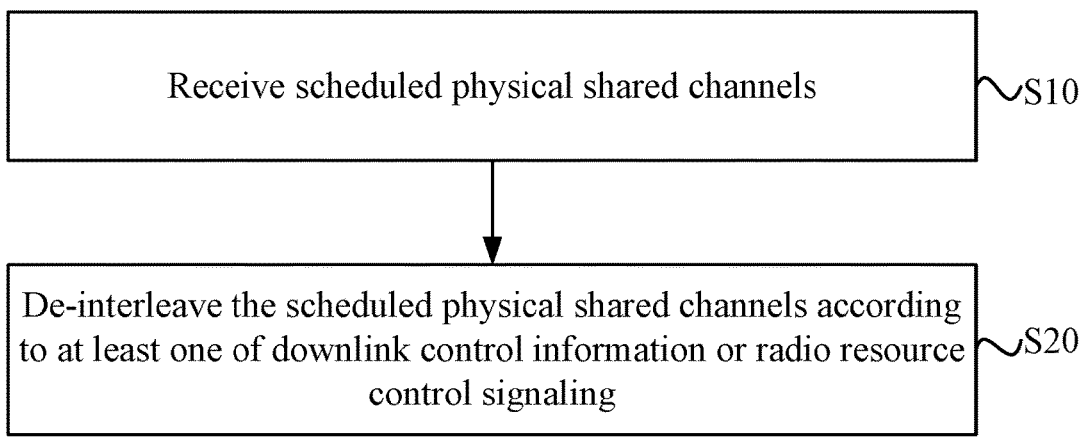
FIG. 5 is a flowchart of a resource scheduling method provided according to an embodiment.

It should be noted that all thresholds are configured by the RRC, all the thresholds include the interleaving granularity parameter or other configured values. FIG. 5 is a flowchart of a resource scheduling method provided according to an embodiment.

As shown in FIG. 5, the resource scheduling method of this embodiment includes step S10 and step S20.

In S10, scheduled physical shared channels are received. The scheduled physical shared channels are interleaved physical shared channels.

In S20, the scheduled physical shared channels are de-interleaved according to at least one of downlink control information or radio resource control signaling.

Figure 6:
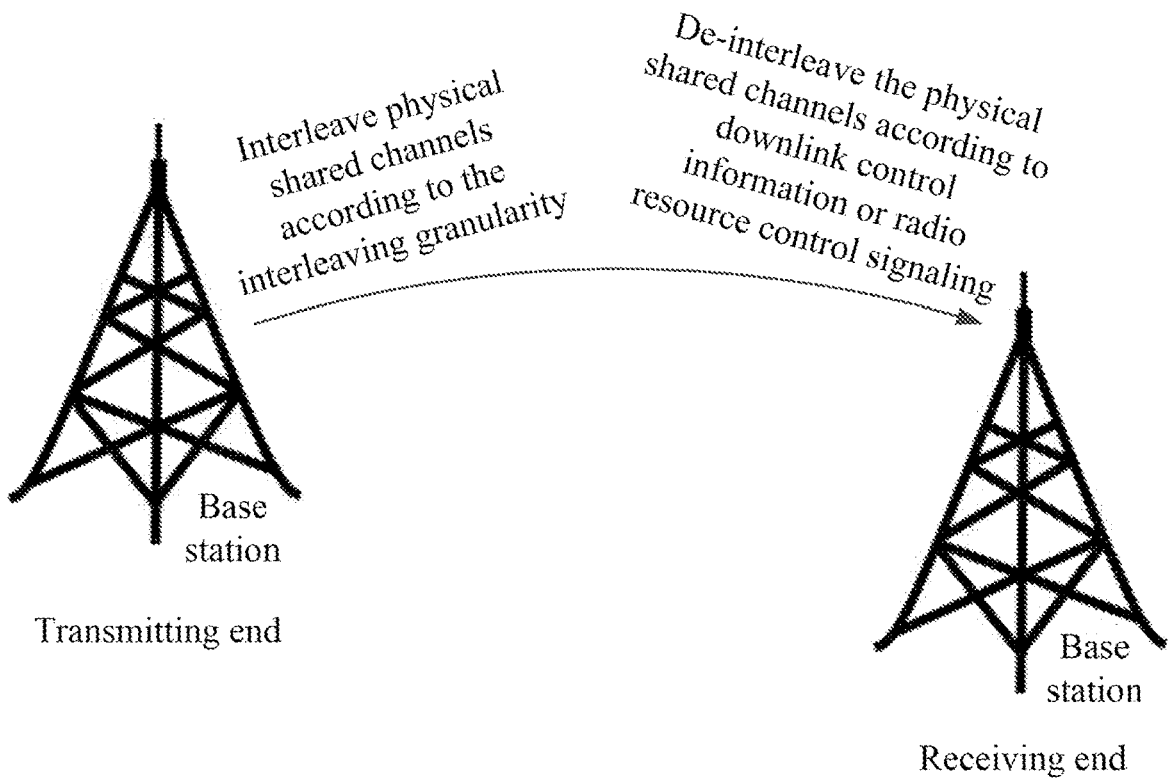
FIG. 6 is a schematic diagram of an application scenario for a resource scheduling method provided according to an embodiment.

FIG. 6 is a schematic diagram of an application scenario for a resource scheduling method provided according to an embodiment.

In an embodiment, a transmitting end interleaves physical shared channels according to the interleaving granularity and transmits the interleaved physical shared channels to a receiving end, and the receiving end de-interleaves the physical shared channels according to downlink control information or radio resource control signaling. The transmitting end and the receiving end may be the base stations or user terminals.

Figure 7:
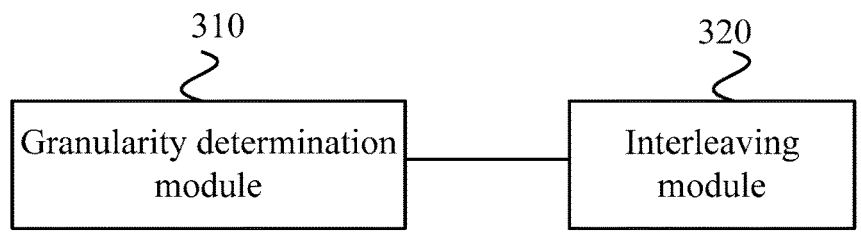
FIG. 7 is a schematic structural diagram of a resource scheduling apparatus provided according to an embodiment.

An embodiment of the present application further provides a resource scheduling apparatus. FIG. 7 is a schematic structural diagram of a resource scheduling apparatus provided according to an embodiment. As shown in FIG. 7, the resource scheduling apparatus includes a granularity determination module 310 and an interleaving module 320.

The granularity determination module 310 is configured to determine an interleaving granularity of scheduled shared channels according to a preset rule.

The interleaving module 320 is configured to interleave the scheduled physical shared channels according to the interleaving granularity.

In an embodiment, the granularity determination module 310 is configured to determine the interleaving granularity according to an interleaving granularity parameter, where the interleaving granularity parameter includes a frequency hopping granularity parameter or a first parameter configured by high-layer signaling.

In an embodiment, the granularity determination module 310 is configured to determine the interleaving granularity according to the first parameter in the case where resources corresponding to the scheduled physical shared channels are first-type resources and radio resource control signaling is not configured with a frequency hopping functionality.

In an embodiment, the granularity determination module 310 is configured to determine the interleaving granularity of the scheduled physical shared channels according to at least one of the frequency hopping granularity parameter or a number of frequency hopping narrow bands in the case where resources corresponding to the scheduled physical shared channels are first-type resources and radio resource control signaling is configured with the frequency hopping functionality.

In an embodiment, the granularity determination module 310 is configured to: determine the interleaving granularity of the scheduled physical shared channels according to the first parameter, a time-domain length of a second-type unit resource and the number of the second-type resources in the case where resources corresponding to the scheduled physical shared channels are second-type resources and radio resource control signaling is not configured with the frequency hopping functionality; or determine the interleaving granularity according to the first parameter and the number of the second-type resources in the case where resources corresponding to the scheduled physical shared channels are second-type resources and radio resource control signaling is not configured with the frequency hopping functionality.

In an embodiment, the granularity determination module 310 is configured to: determine the interleaving granularity of the scheduled physical shared channels according to the frequency hopping granularity parameter, a time-domain length of a second-type unit resource, the number of the second-type resources and the number of frequency hopping narrow bands in the case where resources corresponding to the scheduled physical shared channels are second-type resources and radio resource control signaling is configured with the frequency hopping functionality; or determine the interleaving granularity of the scheduled physical shared channels according to the frequency hopping granularity parameter, a time-domain length of a second-type unit resource, and the number of the second-type resources in the case where resources corresponding to the scheduled physical shared channels are second-type resources and radio resource control signaling is configured with the frequency hopping functionality.

In an embodiment, a resource scheduling unit of the first-type resources is a physical resource block.

In an embodiment, a resource scheduling unit of the second-type resources includes a sub-physical resource block or a resource unit.

In an embodiment, the granularity determination module 310 is configured to determine the first parameter as the interleaving granularity.

In an embodiment, the granularity determination module 310 is configured to: use a product of the first parameter and the number of the frequency hopping narrow bands as the interleaving granularity; or use the frequency hopping granularity parameter as the interleaving granularity. In an embodiment, the granularity determination module 310 is configured to: use a product of the first parameter, the time-domain length of the second-type unit resource and the number of the second-type resources as the interleaving granularity; or use a product of the first parameter and the number of the second-type resources as the interleaving granularity.

In an embodiment, the granularity determination module 310 is configured to:

use a product of the frequency hopping granularity parameter, the time-domain length of the second-type unit resource, the number of the second-type resources and the number of frequency hopping narrow bands as the interleaving granularity;

use a larger value between a product of the frequency hopping granularity parameter and the number of the frequency hopping narrow bands and a product of the time-domain length of the second-type unit resource and the number of the second-type resources as the interleaving granularity;

use a product of the frequency hopping granularity parameter, the time-domain length of the second-type unit resource, and the number of the second-type resources as the interleaving granularity; or use a larger value between the frequency hopping granularity parameter and a product of the time-domain length of the second-type unit resource and the number of the second-type resources as the interleaving granularity.

In an embodiment, the granularity determination module 310 is configured to: determine the interleaving granularity according to the time-domain length of the second-type unit resource and the number of second-type resources in response to determining that resources corresponding to the scheduled physical shared channels are the second-type resources.

In an embodiment, the granularity determination module 310 is configured to use a product of the time-domain length of the second-type unit resource and the number of the second type resources as the interleaving granularity.

In an embodiment, the granularity determination module 310 is configured to determine the interleaving granularity of the scheduled physical shared channels according to a coefficient and time-domain resources occupied by the scheduled physical shared channels; or determine the interleaving granularity of the scheduled physical shared channels according to time-domain resources occupied by the scheduled physical shared channels.

The time-domain resources occupied by the scheduled physical shared channels are one of: the time-domain length of a resource occupied by a single scheduled physical shared channel, the maximum time-domain length of a single scheduled physical shared channel, the time-domain length of all interleaved physical shared channels, or the number of repetitions of the scheduled physical shared channels.

In an embodiment, before the granularity determination module 310 is configured to determine the interleaving granularity of the scheduled physical shared channels according to the coefficient and the time-domain resources occupied by the scheduled physical shared channels, the granularity determination module 310 is further configured to determine the coefficient according to the time-domain resources occupied by the scheduled physical shared channels and a fourth threshold, where the coefficient is at least one of ½, ¼, ⅛ or 1/16, and the fourth threshold includes at least one threshold.

In an embodiment, determining the interleaving granularity of the scheduled physical shared channels according to the preset rule further includes: determining the interleaving granularity according to the time-domain resources occupied by the scheduled physical shared channels and a fifth threshold, where the interleaving granularity is at least one of 4, 8, 16 or 32, and the fifth threshold includes at least one threshold.

In an embodiment, the granularity determination module 310 is configured to determine the interleaving granularity of the scheduled shared channels according to the preset rule, which includes the interleaving granularity is indicated according to downlink control information; or the interleaving granularity is configured according to radio resource control signaling.

The interleaving granularity is at least one of 1, 2, 4, 8, 16, 32, 64, R/2, R/8, R/16, or R/32, where R is the number of repetitions of the scheduled physical shared channels.

In an embodiment, the resource scheduling apparatus further includes an enabling module.

The enabling module is configured to: configure, by a radio resource control layer, an interleaving function before the scheduled physical shared channels are interleaved according to the interleaving granularity; and determine that an interleaving enabling condition is satisfied according to downlink control information or radio resource control signaling.

In an embodiment, the enabling module is configured to determine that the interleaving enabling condition is satisfied according to a predefined threshold after an interleaving function is configured by a radio resource control layer, where the predefined threshold is determined according to radio resource control signaling.

In an embodiment, determining the interleaving enabling condition to be satisfied according to the predefined threshold includes: in the case where a product of R, Z, T and M as time-domain resources occupied by the scheduled physical shared channels is greater than or equal to the predefined threshold, determining the interleaving enabling condition to be satisfied.

M is 1 or the number of the scheduled physical shared channels, Z is 1 or the number of resources corresponding to the scheduled physical shared channels, T is 1 or a time-domain length of resource units corresponding to the scheduled physical shared channels, and R is the number of repetitions of the scheduled physical shared channels.

In an embodiment, determining the interleaving enabling condition to be satisfied according to the predefined threshold includes: in the case where Z is 1, T is 1, M is 1, and the number of repetitions of the scheduled physical shared channels is greater than the predefined threshold, determining the interleaving enabling condition to be satisfied.

The predefined threshold includes at least one of a first threshold, a second threshold, or a third threshold.

The first threshold is the interleaving granularity parameter, the second threshold is determined according to the interleaving granularity parameter and a preset coefficient, the preset coefficient includes at least one of 1, 2, 4 or 8, the interleaving granularity parameter includes the interleaving granularity or the frequency hopping granularity, the interleaving granularity parameter is determined according to the radio resource control signaling; and the preset coefficient is a fixed value or is configured by the radio resource control signaling.

In an embodiment, determining the interleaving enabling condition to be satisfied according to the predefined threshold includes: in the case where Z=1, T=1 and M is the number of the scheduled physical shared channels, determining the interleaving enabling condition to be satisfied according to the number of the scheduled physical shared channels, the number of repetitions of the scheduled physical shared channels and the predefined threshold;

the predefined threshold includes a fifth threshold, a sixth threshold, and a seventh threshold;

in the case where the number of the scheduled physical shared channels is larger than or equal to the fifth threshold and the number of repetitions of the scheduled physical shared channels is larger than or equal to the sixth threshold, the interleaving enabling condition is determined to be satisfied; and in the case where a product of the number of the scheduled physical shared channels and the number of repetitions of the scheduled physical shared channels is larger than the seventh threshold, the interleaving enabling condition is determined to be satisfied.

In an embodiment, determining the interleaving enabling condition to be satisfied according to the predefined threshold includes: in the case where M is the number of the scheduled physical shared channels, T is the time-domain length of the resource units corresponding to the scheduled physical shared channels, and Z is the number of the resources corresponding to the scheduled physical shared channels, determining the enabling according to the time-domain resources occupied by the scheduled physical shared channels and the predefined threshold;

the predefined threshold includes at least one of an eighth threshold or a ninth threshold, the eighth threshold is determined according to the interleaving granularity parameter, and the interleaving granularity parameter includes the frequency hopping granularity parameter or the first parameter configured by the high-layer signaling, the ninth threshold is determined according to the interleaving granularity parameter and a preset coefficient, the preset coefficient includes at least one of 1, 2, 4 or 8; the interleaving granularity parameter is determined according to the radio resource control signaling, and the preset coefficient is a fixed value or is configured by the radio resource control signaling.

According to the resource scheduling apparatus provided in this embodiment, the interleaving granularity is determined according to the preset rule, and the scheduled physical shared channels are interleaved according to the interleaving granularity, so that the problem of a relatively low diversity gain caused by continuous arrangement is solved because data blocks of the same physical shared channel are arranged in a discrete manner during the resource scheduling process. The interleaving of physical shared channel levels is achieved, thus the time-domain diversity gain in the scheduling process is improved and the transmission reliability is ensured.

Figure 8:
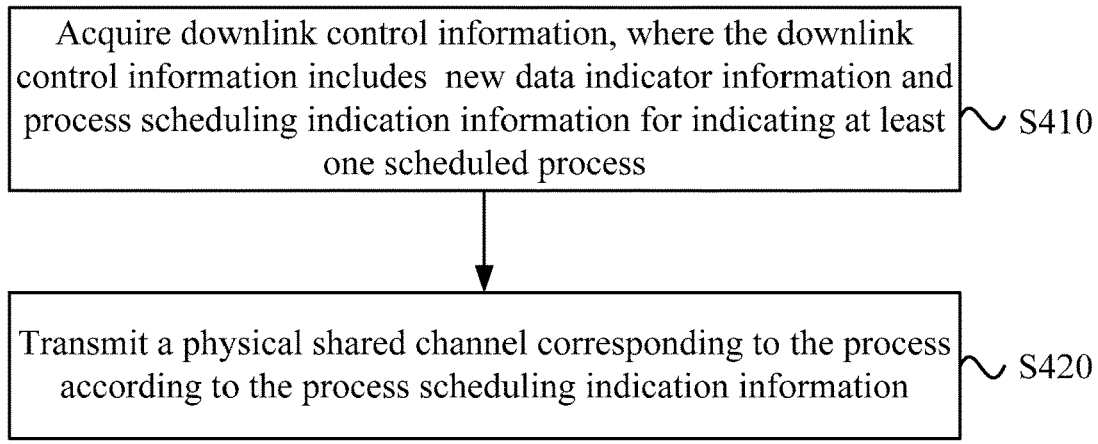
FIG. 8 is a flowchart of a resource transmission method provided according to an embodiment.

An embodiment of the present application further provides a resource transmission method. FIG. 8 is a flowchart of a resource transmission method provided according to an embodiment, as shown in FIG. 8, the method includes step S410 and step S420.

In S410, downlink control information is acquired, where the downlink control information includes process scheduling indication information for indicating at least one scheduled process and new data indicator information.

In S420, a physical shared channel corresponding to the process is transmitted according to the process scheduling indication information.

In an embodiment, the method further includes step S430.

In S430, it is determined that whether each physical shared channel is in a retransmission state or a new transmission state according to the new data indicator information.

The new data indicator (NDI) information is used for indicating that one physical shared channel is in the new transmission state or the retransmission state.

In an embodiment, the preset bit is adopted to indicate the new data indicator information of multiple physical shared channels, and the state of the new data indicator information of the multiple physical shared channels includes a first state and a second state. If downlink control information corresponding to multiple physical shared channels is completely the same, the state of the downlink control information is the first state; otherwise, the state of the downlink control information is the second state.

In an embodiment, if the new data indicator information is in the first state, a first preset number of bits are adopted to indicate scheduling information of a scheduled process, and in the first state, one bit is adopted to indicate the new data indicator information of all processes.

In an embodiment, the first preset number is the maximum number of scheduled physical shared channels.

In an embodiment, if the new data indicator information is in the second state, a second preset number of bits are adopted to indicate the scheduling information of a scheduled process and the new data indicator information of all processes.

In an embodiment, the second preset number is the first preset number plus 1.

In an embodiment, the number of bits for the new data indicator information of all processes is determined according to the number of scheduled processes.

In an embodiment, one bit is adopted to indicate the state of the downlink control information of multiple physical shared channels, and the state of the downlink control information includes the first state and the second state. If the downlink control information corresponding to the multiple physical shared channels is completely the same, the state of the downlink control information is the first state; otherwise, the state of the downlink control information is the second state.

In an embodiment, if the state of the downlink control information is the first state, a first preset number of bits are adopted to indicate the scheduling information of a scheduled process, and one bit is adopted to indicate the downlink control information of all processes.

In an embodiment, the downlink control information state is the first state, and the first preset number is the maximum number of scheduled physical shared channels.

In an embodiment, if the downlink control information state is the second state, a second preset number of bits are adopted to indicate the scheduling information of a scheduled process and the downlink control information of all processes, and the second preset number is the maximum number of the scheduled physical shared channels plus 1, or the second preset number is the first preset number plus 1.

In an embodiment, when the downlink control information state is the second state, the number of bits for the NDI information of all processes is determined according to the number of scheduled processes.

In a traditional resource transmission method, new transmission TBs and retransmission TBs are transmitted separately, the hybrid transmission is not supported, and it is difficult to indicate the state of the hybrid transmission of all processes by using a preset number of bits during the hybrid transmission. The hybrid transmission means that when multiple TBs are scheduled, NDIs corresponding to all TBs are not completely the same, which corresponds to the second state. A non-hybrid transmission corresponds to the first state. According to the resource transmission method provided in this embodiment, in the process scheduling indication information, one bit is adopted to indicate whether the scheduled process is the hybrid transmission or not, and the one bit is a hybrid transmission method field; and (X+1) bits are adopted to indicate the process scheduling and NDI information of N processes. A physical shared channel corresponding to a scheduled process is transmitted according to the process scheduling indication information, thus supporting the hybrid transmission of the new transmission TBs and the retransmission TBs.

In an embodiment, the hybrid transmission method field of 0 represents non-hybrid transmission scheduling, X bits indicate scheduling of a process, and one bit indicates the NDI information; and if the hybrid transmission method field is 1, (X+1) bits represent the scheduling of the hybrid transmission state.

In an embodiment, the number of supported processes is 4, the maximum number of scheduled TBs is 4, and the NDI information, the process scheduling information and the hybrid transmission method field are indicated by 6 bits. When the 1-bit hybrid transmission method field indicates the non-hybrid transmission, the 4-bit bitmap indicates the process scheduling, and one bit is for the NDI and indicates information about the new transmission and retransmission of all TBs. When the 1-bit hybrid transmission method field indicates the hybrid transmission, 5 bits are adopted to represent the scheduling of the hybrid transmission state.

In an embodiment, there are two schemes of the method for indicating the hybrid transmission state described below.

1) the 5-bit scheduling indication of the hybrid transmission state of 4 TBs has a variable number of NDIs.

5 bits are expressed as a, b, c, d and e, which are all binary and have the value of 0 or 1.

When a=0, b, c, d and e are 4 bits NDIs, it represents that 4 TBs are scheduled at this time, and b, c, d and e respectively correspond to the NDI information of one TB.

When a=1 and b=0, the scheduling indication includes 3 bits NDIs and represents that 3 TBs are scheduled at this time, and c, d and e respectively correspond to the NDI information of one TB.

When a=1, b=1, and c=0, the scheduling indication includes 2 bits NDIs and represents that 2 processes from the 4 processes are scheduled, and d and e respectively correspond to the NDI information of the two processes.

When a=1, b=1 and c=1, the scheduling indication includes 2 bits NDIs and represents the other 2 processes in 4 processes are scheduled, and d and e respectively correspond to the NDI information of the two processes.

2) the 5-bit scheduling indication of the hybrid transmission state of 4 TBs has a variable number of NDIs.

When a=0, b, c, d and e are 4 bits NDIs, which represents that 4 TBs are scheduled at this time, and b, c, d and e respectively correspond to the NDI information of one TB.

When a=1, the scheduling indication includes 2 bits NDIs, and 4 state combinations of b and c are used for respectively identifying 4 scheduling states of 2 processes. d and e are 2 bits NDIs and respectively correspond to the NDI information of one process.

Furthermore, the number of supported processes is 4, and the maximum number of TBs is 4.

In an embodiment, the number of supported processes is 8, the maximum of 8 TBs are scheduled, and a total X-bit indication includes the NDI information, process scheduling information, and hybrid transmission information.

One bit is the hybrid transmission method field, when the hybrid transmission method field indicates the non-hybrid transmission, (X-2) bits indicate the process scheduling, and 1-bit NDI indicates information about the new transmission and retransmission of all multiple TBs; and when the hybrid transmission method field indicates the hybrid transmission, (X-1) bits are adopted to represent the scheduling of the hybrid transmission state. X takes an element in $\{6, 7, 10\}$.

In an embodiment, there are two schemes of the method for indicating the hybrid transmission state described below.

When X=4 bits, the hybrid transmission method field indicates that the non-hybrid transmission is performed, one bit indicates the NDI, 4 bits indicate the process scheduling, and a state of the process scheduling includes 0 to 7, 01, 23, 45, 67, 0123, 4567, and 01234567. When the hybrid transmission method field indicates the hybrid transmission, 5 bits indicate the scheduling of the hybrid transmission state, and 6 bits are totally adopted at this time.

In an embodiment, the method for the 5-bit scheduling indication of the hybrid transmission state is as follows.

1) the 5-bit scheduling indication of the hybrid transmission state of 8 TBs has a variable number of NDIs.

5 bits are expressed as a, b, c, d and e, which are all binary and have a value of 0 or 1.

When a=0, the scheduling indication includes 4 bits group NDIs and represents that 8 TBs are scheduled at this time, and every 2 processes are one group and correspond to one NDI.

When a=1, the scheduling indication includes 4 bits NDIs of 4 processes and represents that 4 TBs are all scheduled at this time, and the 4 bits NDIs correspond to NDIs of 4 TBs respectively.

2) the 6-bit scheduling indication of the hybrid transmission state of 8 TBs has a variable number of NDIs.

6 bits are expressed as a, b, c, d, e and f, which are all binary and have the value of 0 or 1.

When a=0, five groups are divided with the number of processes in each group being 1, 1, 2, 2, and 2, and each group corresponds to a 1-bit NDI.

When a=1, and b=0, 4 processes are selected and correspond to 4 bits NDIs.

When a=1, and b=1, the other 4 processes are selected and correspond to 4 bits NDIs.

3) When X=8 and the hybrid transmission method field indicates the non-hybrid transmission, 1 bit indicates the NDI and 8 bits indicate the state of the process scheduling in a bitmap manner. When the hybrid transmission method field indicates the hybrid transmission, 9 bits indicate the scheduling of the hybrid transmission state, and a 10-bit indication is adopted in total at this time.

In an embodiment, the method for indicating the scheduling of the hybrid transmission state is as follows.

9 bits are expressed as a, b, c, d, e, f, g, h and i, which are all binary and have the value of 0 or 1.

When a=0, 8 TBs are scheduled, and 8 bits indicate the NDI information of the 8 processes.

When a=1, and b=0, 7 processes are scheduled, and 7 bits indicate the NDIs of the 7 processes.

When a=1, b=1, and c=0, 6 processes are scheduled, and 6 bits indicate the NDIs of the 6 processes.

When a=1, b=1, c=1, and d=0, 5 processes are scheduled, and 5 bits indicate the NDIs of the 5 processes.

When a=1, b=1, c=1, d=1, and e=0, 4 processes are scheduled, and 4 bits indicate the NDIs of the 4 processes.

When a=1, b=1, c=1, d=1, and e=1, the other 4 processes are scheduled, and 4 bits indicate the NDIs of the other 4 processes.

It should be noted that in the manner 3) for 8 processes and the manner 1) for 4 processes, the indication of the process scheduling and the indication of the number of bits adopted for the NDI use one more bit compared to the bitmap manner; for the hybrid transmission scheduling, the number of bits adopted for indicating the process scheduling is equal to the number of bits adopted for indicating the NDI.

In an embodiment, a 12-bit or 13-bit joint indication manner may be adopted, the 13-bit joint indication refers to that scheduling of all hybrid transmission states is indicated, that is, one process has 3 states including no scheduling, retransmission and new transmission, then 8 processes totally have $(3^{8-1})$ states, and 13 bits are needed for the indication; some states may be removed according to actual requirements, and 12 bits are adopted for the indication.

In an embodiment, the multi-TB interleaving also supports a feedback manner of bundling. One data packet is repeatedly transmitted on multiple continuous resources, and data on the multiple resources is combined at a receiving end to achieve the purpose of improving the transmission quality.

An embodiment of the present application further provides a device. The resource scheduling method may be executed by a resource scheduling apparatus, and the resource scheduling apparatus may be implemented in software and/or hardware and integrated in the device.

Figure 9:
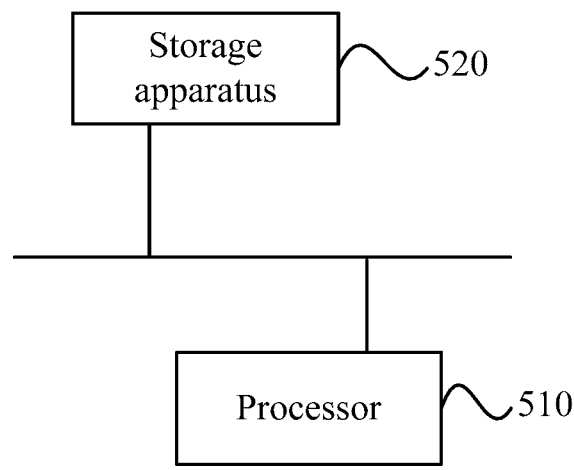
FIG. 9 is a schematic structural diagram of a device provided according to an embodiment.

FIG. 9 is a schematic structural diagram of a device provided according to an embodiment. As shown in FIG. 9, the device provided in this embodiment includes a processor 510 and a storage apparatus 520. The processor in the device may include one or more processors, one processor 510 is used as an example in FIG. 9, and the processor 510 and the storage apparatus 520 in the device may be connected by a bus or other means, and the processor 510 and the storage apparatus 520 are connected by the bus as an example in FIG. 9.

One or more programs are executed by the one processor or more processors 510 to enable the one or more processors to implement the resource scheduling method or the resource transmission method of any one of the embodiments described above.

The storage apparatus 520 in the device serves as a computer-readable storage medium and may be used for storing one or more programs, and the programs may be software programs, computer executable programs and modules, such as the program instruction/module corresponding to the resource scheduling method in the embodiments of the present application (for example, the modules in the resource scheduling apparatus shown in FIG. 4 include the granularity determination module 310 and the interleaving module 320). The processor 510 executes various functional applications and data processing of the device, i.e., implements the resource scheduling method in the above-described method embodiments, by executing software programs, instructions, and modules stored in the storage apparatus 520.

The storage apparatus 520 mainly includes a storage program region and a storage data region, and the storage program region may store an operating system, an application program required by at least one function; the storage data region may store data or the like (such as projection data, back-projection images, or the like in the above-described embodiments) created according to the use of the device. In addition, the storage apparatus 520 may include high-speed random access memory and may further include a non-volatile memory, such as at least one magnetic disk storage device, a flash memory device, or other non-volatile solid-state storage device. In some examples, the storage apparatus 520 may further include a memory disposed remotely with respect to the processor 510, these remote memories may be connected to the device over a network. Examples of the above-described networks include, but are not limited to, the Internet, an intranet, a local area network, a mobile communication network, and combinations thereof.

Moreover, when the one or more programs included in the above-described device are executed by the one or more processors 510, the following operations are implemented: the interleaving granularity of scheduled physical shared channels is determined according to the preset rule, and the scheduled physical shared channels are interleaved according to the interleaving granularity, where the scheduled physical shared channel includes a physical uplink channel and/or a physical downlink channel.

The device proposed in this embodiment belongs to the same inventive concept as the resource scheduling method proposed in the above-described embodiments, the technical details not described in this embodiment may be referred to any of the above embodiments, and this embodiment has the same beneficial effects as the execution of the resource scheduling method.

An embodiment of the present application further provides a storage medium containing computer-executable instructions, when executed by a computer processor, the computer-executable instructions are configured to perform a resource scheduling method, the method includes steps described below, the interleaving granularity of scheduled physical shared channels is determined according to a preset rule; and the scheduled physical shared channels are interleaved according to the interleaving granularity, where the scheduled physical shared channel includes the physical uplink channel and/or the physical downlink channel.

Those skilled in the art will appreciate from the above description of the implementation manners that the present application may be implemented by means of software and general purpose hardware, and may also be implemented by hardware. Based on this understanding, the technical scheme of the present application may be embodied in the form of a software product, and the computer software product may be stored in a computer-readable storage medium, such as a floppy disk of a computer, a read-only memory (ROM), a random access memory (RAM), a flash memory (FLASH), a hard disk or an optional disk, including multiple instructions to enable a computer device (which may be a personal computer, a server, or a network device, etc.) to perform the method described in any of the embodiments of the present application.

The above description is only exemplary embodiments of the present application and not intended to limit the scope of protection of the present application.

Any block diagram of the logic flow in the accompanying drawings of the present application may represent program steps, or may represent interconnected logic circuits, modules, and functions, or may represent a combination of program steps and logic circuits, modules, and functions. The computer program may be stored on a memory. The memory may be of any type suitable for the local technical environment and may be implemented using any suitable data storage technology, such as, but not limited to, a read-only memory (ROM), a random access memory (RAM), an optical memory device and system (digital versatile disc (DVD) or compact disk (CD)), etc. Computer-readable media may include non-instantaneous storage media. Data processors may be of any type suitable for the local technical environment, such as, but not limited to, general-purpose computers, specialized computers, microprocessors, digital signal processors (DSP), application specific integrated circuits (ASIC), field-programmable gate array (FPGA)), and processors based on multi-core processor architectures.

What is claimed is:

1. A resource scheduling method, comprising:
    determining an interleaving granularity of scheduled physical shared channels according to a preset rule by determining the interleaving granularity according to a coefficient and time-domain resources occupied by the scheduled physical shared channels, wherein the time-domain resources occupied by the scheduled physical shared channels comprise a time-domain length of a resource occupied by a single scheduled physical shared channel;
    determining that an interleaving enabling condition is satisfied in response to a number of the scheduled physical shared channels being greater than a first threshold, and a number of repetitions of the scheduled physical shared channels being greater than a second threshold; and
    interleaving the scheduled physical shared channels according to the interleaving granularity in response to the interleaving enabling condition being satisfied.

2. The method of claim 1, wherein determining the interleaving granularity of the scheduled physical shared channels according to the preset rule further comprises:
    determining the interleaving granularity according to an interleaving granularity parameter, wherein the interleaving granularity parameter comprises a frequency hopping granularity parameter or a first parameter configured by high-layer signaling.

3. The method of claim 2, wherein determining the interleaving granularity of the scheduled physical shared channels according to the interleaving granularity parameter comprises:
    determining the interleaving granularity according to the first parameter, wherein resources corresponding to the scheduled physical shared channels are first-type resources and radio resource control signaling is not configured with a frequency hopping functionality.

4. The method of claim 2, wherein determining the interleaving granularity of the scheduled physical shared channels according to the interleaving granularity parameter comprises:
determining the interleaving granularity of the scheduled physical shared channels according to at least one of the frequency hopping granularity parameter or a number of frequency hopping narrow bands, wherein resources corresponding to the scheduled physical shared channels are first-type resources and radio resource control signaling is configured with a frequency hopping functionality.

5. The method of claim 4, wherein determining the interleaving granularity of the scheduled physical shared channels according to the interleaving granularity parameter further comprises:
using a product of the frequency hopping granularity parameter and the number of the frequency hopping narrow bands as the interleaving granularity; or
using the frequency hopping granularity parameter as the interleaving granularity.

6. The method of claim 2, wherein determining the interleaving granularity of the scheduled physical shared channels according to the interleaving granularity parameter comprises:
determining the interleaving granularity according to the first parameter, a time-domain length of a second-type unit resource and a number of the second-type resources, wherein resources corresponding to the scheduled physical shared channels are second-type resources and radio resource control signaling is not configured with a frequency hopping functionality; or
determining the interleaving granularity according to the first parameter and a number of the second-type resources, wherein resources corresponding to the scheduled physical shared channels are second-type resources and radio resource control signaling is not configured with a frequency hopping functionality.

7. The method of claim 6, wherein determining the interleaving granularity of the scheduled physical shared channels according to the interleaving granularity parameter further comprises:
using a product of the first parameter, the time-domain length of the second-type unit resource and the number of the second-type resources as the interleaving granularity; or
using a product of the first parameter and the number of the second-type resources as the interleaving granularity.

8. The method of claim 2, wherein determining the interleaving granularity of the scheduled physical shared channels according to the interleaving granularity parameter comprises:
determining the interleaving granularity according to the frequency hopping granularity parameter, a time-domain length of a second-type unit resource, a number of the second-type resources, and a number of frequency hopping narrow bands, wherein resources corresponding to the scheduled physical shared channels are second-type resources and radio resource control signaling is configured with a frequency hopping functionality; or
determining the interleaving granularity according to the frequency hopping granularity parameter, a time-domain length of a second-type unit resource, and a number of the second-type resources, wherein resources corresponding to the scheduled physical shared channels are second-type resources and radio resource control signaling is configured with a frequency hopping functionality.

9. The method of claim 8, wherein determining the interleaving granularity of the scheduled physical shared channels according to the interleaving granularity parameter further comprises one of:
using a product of the frequency hopping granularity parameter, the time-domain length of the second-type unit resource, the number of the second-type resources, and the number of frequency hopping narrow bands as the interleaving granularity;
using a larger value between a product of the frequency hopping granularity parameter and the number of frequency hopping narrow bands and a product of the time-domain length of the second-type unit resource and the number of the second-type resources as the interleaving granularity;
using a product of the frequency hopping granularity parameter, the time-domain length of the second-type unit resource, and the number of the second-type resources as the interleaving granularity; or
using a larger value between the frequency hopping granularity parameter and a product of the time-domain length of the second-type unit resource and the number of the second-type resources as the interleaving granularity.

10. The method of claim 1, wherein determining the interleaving granularity of the scheduled physical shared channels according to the preset rule comprises:
in response to determining that resources corresponding to the scheduled physical shared channels are second-type resources, determining the interleaving granularity according to a time-domain length of a second-type unit resource and a number of the second-type resources.

11. The method of claim 10, wherein determining the interleaving granularity according to the time-domain length of the second-type unit resource and the number of the second-type resources comprises:
using a product of the time-domain length of the second-type unit resource and the number of the second-type resources as the interleaving granularity.

12. The method of claim 1, wherein before determining the interleaving granularity according to the coefficient and the time-domain resources occupied by the scheduled physical shared channels, the method further comprises:
determining the coefficient according to the time-domain resources occupied by the scheduled physical shared channels and a third threshold; wherein the coefficient is at least one of ½, ¼, ⅛ or 1/16, and the fourth third threshold comprises at least one threshold.

13. The method of claim 1, wherein determining the interleaving granularity of the scheduled shared channel according to the preset rule further comprises:
indicating the interleaving granularity according to downlink control information; or
configuring the interleaving granularity according to radio resource control signaling;
wherein the interleaving granularity is at least one of 1, 2, 4, 8, 16, 32, 64, R/2, R/8, R/16 or R/32, and R is the number of repetitions of the scheduled physical shared channels.

14. The method of claim 1, wherein determining that the interleaving enabling condition is satisfied further comprises:

after an interleaving function is configured by a radio resource control layer, determining that the interleaving enabling condition is satisfied according to a predefined threshold comprising the first threshold and the second threshold, wherein the predefined threshold is determined according to radio resource control signaling.

15. The method of claim 14, wherein
the time-domain resources occupied by the scheduled physical shared channels comprise R, Z, T, and M, wherein a product of R, Z, T and M is greater than or equal to the predefined threshold, wherein M is 1 or the number of the scheduled physical shared channels, Z is 1 or a number of resources corresponding to the scheduled physical shared channels, T is 1 or a time-domain length of resource units corresponding to the scheduled physical shared channels, and R is the number of repetitions of the scheduled physical shared channels.

16. The method of claim 15, wherein
Z is 1, T is 1, M is 1, and R is greater than the predefined threshold,
wherein the predefined threshold further comprises at least one of a third threshold, a fourth threshold or a fifth threshold;
the third threshold is an interleaving granularity parameter or configured by the radio resource control signaling;
the fourth threshold is determined according to the interleaving granularity parameter and a preset coefficient;
the preset coefficient comprises at least one of 1, 2, 4 or 8;
the interleaving granularity parameter comprises the interleaving granularity or a frequency hopping granularity, and the interleaving granularity parameter is determined according to the radio resource control signaling; and
the preset coefficient is a fixed value or configured by the radio resource control signaling.

17. The method of claim 15, wherein
Z=1, T=1 and M is the number of the scheduled physical shared channels,
wherein the predefined threshold further comprises a third threshold,
wherein determining that the interleaving enabling condition is satisfied is further in response to a product of the number of scheduled physical shared channels and the number of repetitions of the scheduled physical shared channels being larger than the third threshold.

18. The method of claim 15, wherein
M is the number of the scheduled physical shared channels, T is the time-domain length of the resource units corresponding to the scheduled physical shared channels, and Z is the number of the resources corresponding to the scheduled physical shared channels,
wherein the predefined threshold further comprises at least one of a third threshold or a fourth threshold;
the third threshold is determined according to an interleaving granularity parameter or configured by high-layer signaling, and the interleaving granularity parameter comprises a frequency hopping granularity parameter or a first parameter configured by the high-layer signaling;
the fourth threshold is determined according to the interleaving granularity parameter and a preset coefficient;
the preset coefficient comprises at least one of 1, 2, 4 or 8;
the interleaving granularity parameter is determined according to the radio resource control signaling; and
the preset coefficient is a fixed value or configured by the radio resource control signaling.

19. A resource scheduling apparatus, comprising:
a memory storing a plurality of instructions; and
a processor configured to execute the plurality of instructions, and upon execution of the plurality of instructions, the processor is configured to:
determine an interleaving granularity of scheduled shared channels according to a preset rule by a determination of the interleaving granularity according to a coefficient and time-domain resources occupied by the scheduled physical shared channels, wherein the time-domain resources occupied by the scheduled physical shared channels comprise a time-domain length of a resource occupied by a single scheduled physical shared channel;
determine that an interleaving enabling condition is satisfied in response to a number of the scheduled physical shared channels being greater than a first threshold, and a number of repetitions of the scheduled physical shared channels being greater than a second threshold; and
interleave the scheduled physical shared channels according to the interleaving granularity, wherein the scheduled shared channels comprise at least one of a physical uplink channel or a physical downlink channel.

20. A non-transitory computer-readable storage medium storing a computer program, wherein the computer program, when executed by a processor, is configured to cause the processor to:
determine an interleaving granularity of scheduled shared channels according to a preset rule by a determination of the interleaving granularity according to a coefficient and time-domain resources occupied by the scheduled physical shared channels, wherein the time-domain resources occupied by the scheduled physical shared channels comprise a time-domain length of a resource occupied by a single scheduled physical shared channel;
determine that an interleaving enabling condition is satisfied in response to a number of the scheduled physical shared channels being greater than a first threshold, and a number of repetitions of the scheduled physical shared channels being greater than a second threshold; and
interleave the scheduled physical shared channels according to the interleaving granularity, wherein the scheduled shared channels comprise at least one of a physical uplink channel or a physical downlink channel.

* * * * *